June 29, 1926.
C. A. DE GIERS
LIQUID LEVEL INDICATOR
Filed May 28, 1920
1,590,287
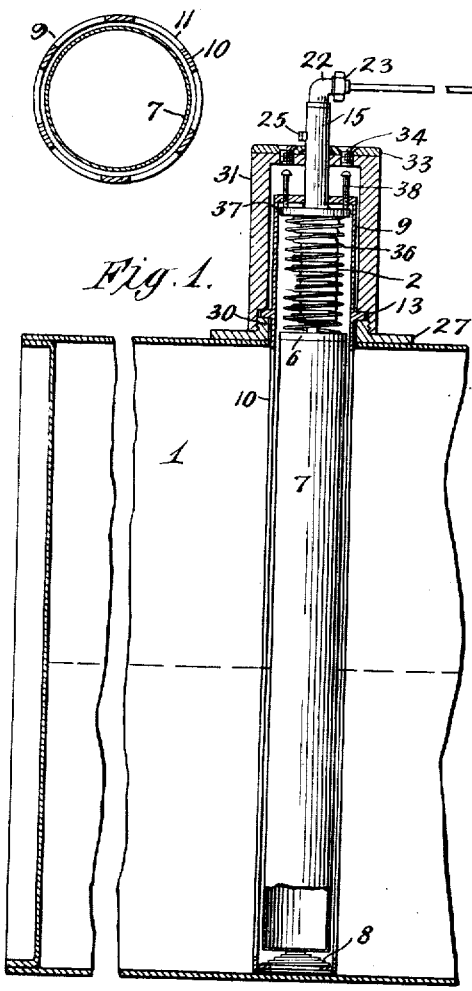

Patented June 29, 1926.

1,590,287

UNITED STATES PATENT OFFICE.

CLARENCE A. DE GIERS, OF NEW YORK, N. Y., ASSIGNOR TO LIQUIDOMETER COMPANY, A CORPORATION OF DELAWARE.

LIQUID-LEVEL INDICATOR.

Application filed May 28, 1920. Serial No. 384,796.

This invention relates to certain improvements in operating mechanism for indicators of that class in which the quantity of liquid in a tank or similar receptacle may be indicated at any desired point, the mechanism of the indicator being operated by the height of the fluid in the receptacle.

It is the especial object of the invention to produce such a mechanism of simple construction in which a closed compressible chamber filled with suitable indicating fluid is provided, this chamber being directly connected to a float actuated by liquid in the receptacle thereby eliminating ball floats with their necessary arms, hinged joints, bearings, packings, etc.

A further object of the invention is to provide such a mechanism which will have but a small movement to effect its indicating function and one which can be used in any tank or well, and particularly in deep and narrow ones.

A further object of the invention is to produce an indicator and operating mechanism therefor of this class which can be employed in a tank from which the fluid is ejected under pressure, such for instance, as certain types of fuel tanks used in automobiles and air plane construction.

A further object of the invention is to produce devices for effecting the principal objects of the invention which shall be of few parts, cheap to construct, easily installed, and by which, due to the lack of working parts, there will be slight wear, so that even after long service it will work very accurately.

With these and other objects, not specifically referred to, the invention consists in certain novel parts and combinations, which will be fully described in connection with the accompanying drawings and then pointed out in the claims annexed hereto.

In these drawings—

Figure 1 is a side elevation partly in section and partly broken away, of a preferred form of the device mounted in a tank.

Figure 2 is a vertical sectional view partly broken away of the device shown in Fig. 1, on an enlarged scale.

Figure 3 is a horizontal section taken on line 3—3 of Fig. 2.

Figure 4 is a horizontal section taken on line 4—4 of Fig. 2.

Figure 5 is a sectional elevation of a modified arrangement which may be used under certain conditions; and Figure 6 is a diagrammatic plan view of the disposition of two operating mechanisms arranged at different points in the tank and connected to a central indicating chamber which leads to an indicating device.

Referring now to these drawings, the indicator and its operating mechanism has been shown as employed with a tank, such as a fuel tank of an automobile, with which the indicator is particularly useful, but it will be understood that the type of containers with which the device may be used may be of any character, it being particularly useful with deep or narrow tanks or receptacles.

In these drawings, referring first to Figs. 1 to 4, the tank is indicated by the numeral 1. The indicator mechanism is secured in operative relation with the tank and will include a closed chamber filled with a non-compressible indicating liquid and formed with walls which may be contracted and expanded in a vertical direction, but which will resist sidewise pressure so that the chamber may be used in pressure tanks and the like and not be operated by the air pressure therein. This chamber, furthermore, will be directly connected with a float actuated by the liquid in the tank, and will have with the float a vertical movement in the tank, this direct connection eliminating moving parts and permitting the use of the device in deep and narrow structures, such as the baffled or partitioned tanks commonly used for containing motor fluid.

The specific construction of this closed chamber, which is marked 2, may be varied but preferably it is made of some resilient material which can be compressed and expanded longitudinally, but which will resist sidewise pressure, such as thin copper, the walls of the chamber being bent or corrugated, as indicated at 8, to form in effect a bellows, which will contract and expand vertically. The bottom wall 4 of the chamber is secured directly as by soldering, to a stem 5 rising from a flanged plate 6, which forms the top of the float 7. This float may be of any suitable character. As shown, it is a metal cylinder closed at each end and of a length sufficient to extend substantially between the top and bottom of the tank, so that its operative movement is very small. In the best constructions, means will be provided for counterbalancing the weight of this float so that the float will respond immediately to variations in the height of the liquid. In the particular construction illustrated, such compensating means is a spring 8 located at the bottom of the tank against which the lower end of the float contacts, this spring being tensioned to equalize the weight of the float.

Guiding and protecting means are provided for the float which may be of any suitable character. As shown, there is provided a casing 9 which may be in the form of a web or spider having webs 10 with spaces 11 there-between through which the liquid in the tank has access to the float. This casing in the form shown in Figs. 1 and 2 extends through a suitable aperture 12 in the top of the tank and extends above the tank a sufficient distance to provide a compartment for the closed chamber 2, before referred to. This web casing a short distance above the top of the tank is provided with a flange 13 hereinafter referred to, and with a top 14 which is preferably integral therewith. This top 14 has a central aperture through which extends with a tight fit a neck 15 integral with the body of the chamber 2. This neck has tightly secured therein a plug 16 which is provided with an aperture 17 through which the indicating liquid marked 18 which is held in the chamber 2, may be delivered to the indicating device proper. This indicating device, which is shown in the form of a graduated tube 19, is mounted on a plate or other suitable support 20 which may be attached to any desired part of a motor vehicle, air plane or other structure with which the device is to be used, connection being had with the closed chamber 2 through suitable piping 21 and an elbow 22 screwed into the plug 16, before referred to, the elbow and pipe being connected by a coupling 23 of any suitable character. It will be understood that any indicating device may be used instead of the graduate shown which is actuated by fluid pressure.

The chamber 2 may be filled with liquid in any suitable manner, but in the preferred construction, and so that further liquid may be supplied to the chamber in the event of loss, the plug 16, before referred to, is provided with a channel 24 which has an opening through the neck 15 which opening is closed in any suitable manner, as by a threaded plug 25. With this construction, by removing the plug the chamber 2 may be filled or may have additional liquid supplied thereto when desired.

In the best construction, the closed chamber 2 will be so positioned as to have an air space around it in communication with the tank so that it is unaffected by any air pressure in the tank, and this is effected by making the upper part of the casing 9 of larger dimensions than the chamber 2, to provide this air space, marked 26, around the chamber.

The operating mechanism may be secured in position in various ways. As illustrated, there is provided a plate 27 soldered or otherwise permanently secured to the tank and having an aperture 28 through which the casing 9, before referred to, extends. This plate has formed thereon an exteriorly threaded boss or projection 30, the upper face of which forms a seat for the flange 13 of the casing 9, before referred to. Screwed on to the boss is a cap 31 having a recess 32 into which the flange 13 projects. When this cap is screwed down, therefore, the casing 9 and the part carried thereby are firmly clamped in position on the tank. The cap 31 is provided with a removable top plate 33, this top plate being secured to the cap by screws 34. The neck 15 of the closed chamber 2, before referred to, passes through the cap and plate which are suitably apertured to permit this, the neck having a tight fit in the aperture, and a packing 35 is provided around the neck between it and the top plate 33 to effect a tight joint to prevent air from escaping from the tank where the device is used with pressure tanks.

In constructions embodying the invention in its best form, means will be provided for adjusting the movement of the float with respect to the compression chamber so that the float may have the required compression action on the chamber depending on the type or form of indicator with which the device is used. While various constructions may be employed for this purpose, in the particular construction illustrated, there is provided a spring 36, taking at one end in the recessed top of the float 7, before referred to, and at its other end against a recessed cap 37. This cap and spring are shown as surrounding the aperture chamber 2, but are clear thereof, so that the spring may be moved independently of the compression chamber. This spring is adjusted in any suitable manner as by set screws 38 passing through the top of the casing 9, before referred to, and these screws are preferably arranged so as to be beneath the screws 34 by which the top plate 33 is held in place so that by removing these screws 34 the screws 38 may be readily adjusted to give the spring any desired tension.

It will be seen that by the construction described a very sensitive indicator mechanism has been provided and one which because of the few parts and the absence of moving parts will last for a long time without getting out of order and which is simple and easy to install. This indicating mechanism may be used in a variety of ways, some of which are indicated in the drawings, as for instance, as shown in Fig. 5, the device may be submerged in a tank or other container with which it is to be used. As shown, in this figure there is provided a cage 40 in which works a float 41, this cage being secured to the bottom of the tank in any suitable manner as by screws 42 screwed into the bottom of the tank. Float guides 44 are or may be provided for guiding the float in its movements in the cage. These float guides 44 are in the form of spaced projections rising from the bottom of the cage 40, these projections being of a sufficient height to guide the float in its up and down movement, the float working inside these projections. The operating mechanism in this instance is the same as that already described and need not be described again, the parts being supported from the top of the cage 40, and connected with the indicator (not shown in this figure) by the pipe 21.

With the device thus used, an increase in the amount of liquid in the tank will increase the pressure and consequently the lift of the floor which correspondingly actuates the indicator.

It may be desired for very accurate reading in tanks which are to be subjected to extreme tipping or turning movements, such as the fuel tanks of motor cars or air planes to provide two of the operating mechanisms disposed at diagonally opposite corners of the tank, these two operating mechanisms delivering to a common collecting chamber which in turn leads to the indicator, and such a construction is diagrammatically illustrated in Fig. 6. As there shown there is a rectangular tank 50 of the usual type for supplying fuel to internal combustion motors. In diagonally opposite corners of this tank are mounted, as before described, two of the operating mechanisms, marked 51, 52, and pipes 53 lead from each of these mechanisms to a common collecting chamber 54 from which a pipe 55 leads to the indicator. With this construction no matter how the tank is tipped or turned the two mechanisms co-operate together to indicate the amount of fluid in the tank, the average of the two indicators being produced in the collecting chamber and an accurate reading of the tank's contents can thus be obtained.

While the invention has been shown and described in its preferred form it will be understood that various changes and variations may be made in the specific details of the construction and the invention is not to be restricted to the exact construction shown and described, nor to the form of containers illustrated.

What I claim is:

1. The combination of a tank for containing liquid, a vertically moving float in the tank, a chamber directly connected to the float, said chamber containing a fluid and being adapted to be compressed or expanded by the movement of the float, an indicator, fluid pressure connections from the chamber to the indicator, and means for effecting the compression of the chamber for adjusting the movement of the float.

2. The combination of a tank for containing liquid, a closed chamber of compressible metal formed in the shape of a bellows containing a fluid, an indicating device, means connecting said indicating device with the closed chamber, a float in the tank and directly connected to the chamber for vertically expanding and contracting it, and means for effecting the compression of the chamber for adjusting the movement of the float.

3. The combination of a tank for containing liquid, a closed compressible chamber containing a fluid, an indicator connected with the chamber, a vertically moving float in the tank, means directly connecting the float to the chamber, and means for effecting its compression for adjusting the movement of the float.

4. The combination of a tank for containing a liquid, a closed compressible chamber containing a fluid, an indicator connected with the chamber, a float in the tank, means directly connecting the float to the chamber, and a spring with means for adjusting it for varying the compressing action of the float.

5. The combination of a tank for containing liquid, a bellows shaped chamber of resilient material containing a fluid, an indicator connected with the chamber, a float in the tank, means directly connecting the float to the chamber, a casing open to the liquid in the tank and surrounding the float, and means for counterbalancing the weight of the float.

6. The combination of a tank for containing liquid, a bellows shaped chamber of resilient metal compressible in the direction of its vertical axis and containing a fluid, an indicator connected with the chamber, a float in the tank, means directly connecting the float to the chamber for effecting its compression, a casing open to the fluid in the tank and surrounding the chamber and the float, and means adjustable through the casing for varying the compression action of the float.

7. The combination of a tank for containing liquid, a pair of compressible chambers containing a fluid disposed at diagonally opposite corners of the tank, a chamber common to both compression chambers, an indicator, means connecting the indicator with the common chamber, and a pair of floats in the tank and directly connected to their respective compression chambers for effecting their compression.

8. The combination of a tank for containing liquid, a closed compressible chamber containing a fluid, an indicator connected with the chamber, a vertically moving float in the tank, means connecting the float in the chamber beneath and to line therewith for effecting its compression, and means for counterbalancing the weight of the float.

9. The combination of a tank for containing liquid, a bellows shaped chamber of resilient metal compressible in the direction of its vertical axis and containing a fluid, an indicator, means connecting the indicator with the chamber, a float in the tank directly connected to the chamber for effecting its compression, a casing open to the fluid in the tank and surrounding the chamber and float, a spring independent of the chamber and co-operating with the float for resisting its lifting action, and means adjustable through the casing for varying the tension of the spring.

10. The combination of a tank for containing liquid, a bellows shaped chamber of resilient metal compressible in the direction of its vertical axis and containing a fluid, a float in the tank connected to the chamber, a neck secured to the chamber and having a liquid outlet, an indicator, pipe connections from the outlet to the indicator, and a filling inlet extending through the neck of the interior of the chamber.

11. The combination of a tank for containing liquid, a chamber compressible in the direction of its vertical axis and containing a fluid, an indicator, means connecting the indicator with the chamber, a float in the tank connected to the chamber, a closing means arranged about the chamber to leave an air space around the chamber in communication with the tank, and means for sealing the closing means against escape of air from the tank.

12. The combination of a tank for containing liquid, a bellows shaped chamber of resilient metal compressible in the direction of its vertical axis and containing a fluid, a float of small diameter and substantially the depth of the tank directly connected to the chamber for effecting its vertical compression, a spring and means for adjusting it independently of the chamber for varying the movement of the float, an indicator, and connections from the chamber to the indicator.

13. The combination of a tank for containing liquid, a bellows shaped chamber of resilient metal compressible in the direction of its vertical axis and containing a fluid, an indicator, connections from the chamber to the indicator, a float in the tank connected with the chamber, a casing open to the fluid in the tank and surrounding the chamber and float, a spring for varying the compressing action of the float, adjusting screws for adjusting the spring, a cap surrounding the casing provided with openings through which the adjusting screws may be adjusted, and means for closing the openings.

In testimony whereof, I have hereunto set my hand.

CLARENCE A. de GIERS.

in the tank and directly connected to their respective compression chambers for effecting their compression.

8. The combination of a tank for containing liquid, a closed compressible chamber containing a fluid, an indicator connected with the chamber, a vertically moving float in the tank, means connecting the float in the chamber beneath and to line therewith for effecting its compression, and means for counterbalancing the weight of the float.

9. The combination of a tank for containing liquid, a bellows shaped chamber of resilient metal compressible in the direction of its vertical axis and containing a fluid, an indicator, means connecting the indicator with the chamber, a float in the tank directly connected to the chamber for effecting its compression, a casing open to the fluid in the tank and surrounding the chamber and float, a spring independent of the chamber and co-operating with the float for resisting its lifting action, and means adjustable through the casing for varying the tension of the spring.

10. The combination of a tank for containing liquid, a bellows shaped chamber of resilient metal compressible in the direction of its vertical axis and containing a fluid, a float in the tank connected to the chamber, a neck secured to the chamber and having a liquid outlet, an indicator, pipe connections from the outlet to the indicator, and a filling inlet extending through the neck of the interior of the chamber.

11. The combination of a tank for containing liquid, a chamber compressible in the direction of its vertical axis and containing a fluid, an indicator, means connecting the indicator with the chamber, a float in the tank connected to the chamber, a closing means arranged about the chamber to leave an air space around the chamber in communication with the tank, and means for sealing the closing means against escape of air from the tank.

12. The combination of a tank for containing liquid, a bellows shaped chamber of resilient metal compressible in the direction of its vertical axis and containing a fluid, a float of small diameter and substantially the depth of the tank directly connected to the chamber for effecting its vertical compression, a spring and means for adjusting it independently of the chamber for varying the movement of the float, an indicator, and connections from the chamber to the indicator.

13. The combination of a tank for containing liquid, a bellows shaped chamber of resilient metal compressible in the direction of its vertical axis and containing a fluid, an indicator, connections from the chamber to the indicator, a float in the tank connected with the chamber, a casing open to the fluid in the tank and surrounding the chamber and float, a spring for varying the compressing action of the float, adjusting screws for adjusting the spring, a cap surrounding the casing provided with openings through which the adjusting screws may be adjusted, and means for closing the openings.

In testimony whereof, I have hereunto set my hand.

CLARENCE A. DE GIERS.

Certificate of Correction.

It is hereby certified that in Letters Patent No. 1,590,287, granted June 29, 1926, upon the application of Clarence A. de Giers, of New York, N. Y., for an improvement in "Liquid-Level Indicators," errors appear in the printed specification requiring correction as follows: Page 4, line 9, claim 8, for the word "in" read *to* and for the word "to" read *in;* and that the said Letters Patent should be read with these corrections therein that the same may conform to the record of the case in the Patent Office.

Signed and sealed this 17th day of August, A. D. 1926.

[SEAL.]

M. J. MOORE,
*Acting Commissioner of Patents.*

Certificate of Correction.

It is hereby certified that in Letters Patent No. 1,590,287, granted June 29, 1926, upon the application of Clarence A. de Giers, of New York, N. Y., for an improvement in "Liquid-Level Indicators," errors appear in the printed specification requiring correction as follows: Page 4, line 9, claim 8, for the word "in" read *to* and for the word "to" read *in;* and that the said Letters Patent should be read with these corrections therein that the same may conform to the record of the case in the Patent Office.

Signed and sealed this 17th day of August, A. D. 1926.

[SEAL.]
M. J. MOORE,
*Acting Commissioner of Patents.*